United States Patent
Kenna et al.

(10) Patent No.: US 11,580,424 B2
(45) Date of Patent: Feb. 14, 2023

(54) AUTOMATICALLY REFINING APPLICATION OF A HIERARCHICAL CODING SYSTEM TO OPTIMIZE CONVERSATION SYSTEM DIALOG-BASED RESPONSES TO A USER

(71) Applicant: INTERNATIONAL BUSINESS MACHINES CORPORATION, Armonk, NY (US)

(72) Inventors: Kimberly D. Kenna, Cary, NC (US); Andrew R. Freed, Cary, NC (US); Isa M. Torres, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 16/841,665

(22) Filed: Apr. 6, 2020

(65) Prior Publication Data

US 2021/0312304 A1  Oct. 7, 2021

(51) Int. Cl.
*G06N 5/04* (2006.01)
*G06F 40/205* (2020.01)
*G06N 20/00* (2019.01)
*G06F 16/24* (2019.01)

(52) U.S. Cl.
CPC ............... *G06N 5/04* (2013.01); *G06F 16/24* (2019.01); *G06F 40/205* (2020.01); *G06N 20/00* (2019.01)

(58) Field of Classification Search
CPC ........................................................ G06N 5/04
See application file for complete search history.

(56) References Cited

U.S. PATENT DOCUMENTS

| | | | |
|---|---|---|---|
| 6,746,399 B2 | 6/2004 | Iliff | |
| 8,066,636 B2 | 11/2011 | Iliff | |
| 9,575,963 B2 | 2/2017 | Pasupalak et al. | |
| 2004/0220831 A1 | 11/2004 | Fabricant | |
| 2005/0240439 A1 | 10/2005 | Covit et al. | |
| 2008/0051639 A1 | 2/2008 | Iliff | |
| 2008/0183658 A1* | 7/2008 | Mangipudi | G06F 16/254 |

(Continued)

OTHER PUBLICATIONS

Vegesna et al, "Ontology Based Chatbot", International Journal of Computer Applications (0975-8887), vol. 179—No. 14, Jan. 2018, 5 pages.

(Continued)

*Primary Examiner* — Van H Oberly
(74) *Attorney, Agent, or Firm* — Aaron N. Pontikos

(57) ABSTRACT

A service identifies a level of specificity of one or more identified entities in a user input comprising a query, within one of multiple levels of a hierarchy of a hierarchical coding system. Responsive to determining that additional levels of specificity beyond the identified level of specificity are recommended to return a minimum answer set to the query, the service returns one or more answers requesting one or more additional inputs refining the query based on one or more values identified in a next level. Responsive to determining that no additional levels of specificity beyond the identified level of specificity are recommended to return the minimum answer set to the query, the service returns an answer set comprising a selection of information for the current level of specificity from an ingested corpus of knowledge mapped to the hierarchical coding system.

18 Claims, 11 Drawing Sheets

(56) References Cited

U.S. PATENT DOCUMENTS

| 2015/0066479 | A1 | 3/2015 | Pasupalak |
| 2017/0242899 | A1 | 8/2017 | Jolley et al. |
| 2018/0052884 | A1 | 2/2018 | Kale et al. |
| 2018/0107685 | A1 | 4/2018 | Kale et al. |
| 2018/0157681 | A1* | 6/2018 | Yang ................ G06F 16/90332 |

OTHER PUBLICATIONS

Augello et al, "Chatbots as Interface to Ontologies", Advances in Intelligent Systems and Computing, Jan. 1, 2014, abstract, 6 pages.
Hallili, Amine, "Toward an Ontology-based chatbot endowed with natural language processing and generation", 26th European Summer School in Logic, Language & Information, Aug. 2014, 7 pages.
Singh, Brij Raj, "Chat Bots—Designing Intents and Entities for your NLP Models", accessed online from <https://medium.com/@brijrajsingh/chat-bots-designing-intents-and-entities-for-your-nlp-models-35c385b7730d>, Jan. 29, 2017, 11 pages.
Xie et al., "A Neural Architecture for Automated ICD Coding", Proceedings of the 56th Annual Meeting of the Association for Computational Linguistics (Long Papers), pp. 1066-0176, Jul. 15, 2018, 11 pages.
Craig Trim, "NLP-driven Ontology Modeling", IBM blog, accessed online as of Nov. 27, 2019 from <https://www.ibm.com/developerworks/community/blogs/nlp/entry/nlp_driven_ontology_modeling8?lang=en, 5 pages.
Al Qady, Mohammed A., "Concept relation extraction using natural language processing: the CRISP technique", Iowa State University, 2008, 125 pages.
Sodha, Sean, "How to get started with Natural Language Processing", IBM.com, With Watson, Oct. 3, 2019, 6 pages.
Al-Zubaide, et al., "OntBot: Ontology Based Chatbot", 2011 Fourth International Symposium on Innovation in Information & Communication Technology, 6 pages.
Augello, et al., "Chatbots as Interface to Ontologies", In: Advances onto the Internet of Things, pp. 285-299, Part of Advances in Intelligent Systems and Computing book series (AISC, vol. 260), Springer, Abstract Only, First Online: Jan. 1, 2014, DOI: 10.1007/978-3-319-03992-3_20.

* cited by examiner

USER INTERFACE 602

USER INPUT: I AM A CANCER PATIENT -
CAN YOU HELP ME FIND SOME TRIALS?
604

ANSWER: WHAT TYPE OF CANCER?
OPTIONS -LUNG -BREAST -COLON
606

| ENTITIES 610 | @CONDITION_L1: CANCER |
| --- | --- |
| INTENTS 612 | #FIND_TRIALS |
| $FQ_NAME 614 | "CONDITION" |

USE METADATA TO FIND A PATH
FOR HI/LO CONDITION LEVELS IN
UTTERANCE                          620

@CONDITION_L1:CANCER
LEVEL: 1
VALUE: CANCER

HI_LEVEL
LO_LEVEL

METADATA SHOWS LO_LEVEL ENTRY HAS CHILDREN

QUERY THE METADATA FOR THE CURRENT LEVEL
IN THE PATH STARTING WITH HI_LEVEL        630

| ITERATION | CONDITION | HAS CHILDREN VALUE IN METADATA |
| --- | --- | --- |
| 1 | LEVEL == "CONDITION_L1" && TYPES[M]=="CANCER" | YES |

PREFIX VALUE TO $FQ_NAME, SET $FQ_COMPLETE = FALSE

| ITERATION | $FQ_NAME | $FQ_COMPLETE |
| --- | --- | --- |
| 1 | "CANCER" | FALSE |

AUTOMATICALLY REFINING APPLICATION OF A HIERARCHICAL CODING SYSTEM TO OPTIMIZE CONVERSATION SYSTEM DIALOG-BASED RESPONSES TO A USER

BACKGROUND

1. Technical Field

One or more embodiments of the invention relate generally to data processing and particularly to automatically refining application of a hierarchical coding system to optimize conversation system dialog-based responses to a user.

2. Description of the Related Art

Natural language processing (NLP) refers to a technique that supports applications that facilitate human interaction in natural language with machines. For example, one branch of NLP pertains to answering questions through a conversation system dialog about a subject matter based on information available about the subject matter from a large corpus, or collection of data, such as text, stored electronically.

BRIEF SUMMARY

In one embodiment, a method is directed to, responsive to receiving a user input comprising a query with an intent correlating with a focus of a hierarchical coding system, applying, by a computer, a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels. The method is directed to, responsive to determining that additional levels of specificity beyond the identified level of specificity are recommended to return a minimum answer set to the query, returning, by the computer, one or more answers requesting one or more additional inputs refining the query based on one or more values identified in a next level in the orchestration layer. The method is directed to, responsive to determining that no additional levels of specificity beyond the identified level of specificity are recommended to return the minimum answer set to the query, returning by the computer, an answer set comprising a selection of information for the current level of specificity from an ingested corpus of knowledge mapped to the hierarchical coding system.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to, responsive to receiving a user input comprising a query with an intent correlating with a focus of a hierarchical coding system, apply a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels. The stored program instructions comprise program instructions to, responsive to determining that additional levels of specificity beyond the identified level of specificity are recommended to return a minimum answer set to the query, return one or more answers requesting one or more additional inputs refining the query based on one or more values identified in a next level in the orchestration layer. The stored program instructions comprise program instructions to, responsive to determining that no additional levels of specificity beyond the identified level of specificity are recommended to return the minimum answer set to the query, return an answer set comprising a selection of information for the current level of specificity from an ingested corpus of knowledge mapped to the hierarchical coding system.

In another embodiment, a computer program product comprises a computer readable storage medium having program instructions embodied therewith, wherein the computer readable storage medium is not a transitory signal per se. The program instructions executable by a computer to cause the computer to, responsive to receiving a user input comprising a query with an intent correlating with a focus of a hierarchical coding system, apply, by a computer, a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels. The program instructions executable by a computer to cause the computer to, responsive to determining that additional levels of specificity beyond the identified level of specificity are recommended to return a minimum answer set to the query, return, by the computer, one or more answers requesting one or more additional inputs refining the query based on one or more values identified in a next level in the orchestration layer. The program instructions executable by a computer to cause the computer to, responsive to determining that no additional levels of specificity beyond the identified level of specificity are recommended to return the minimum answer set to the query, return, an answer set comprising a selection of information for the current level of specificity from an ingested corpus of knowledge mapped to the hierarchical coding system.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 6 illustrates one example of a block diagram of an interactive dialog controller and answer retrieval controller for applying a first level a hierarchical coding system at runtime to determine which answers to return in an answer dialog to a user;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
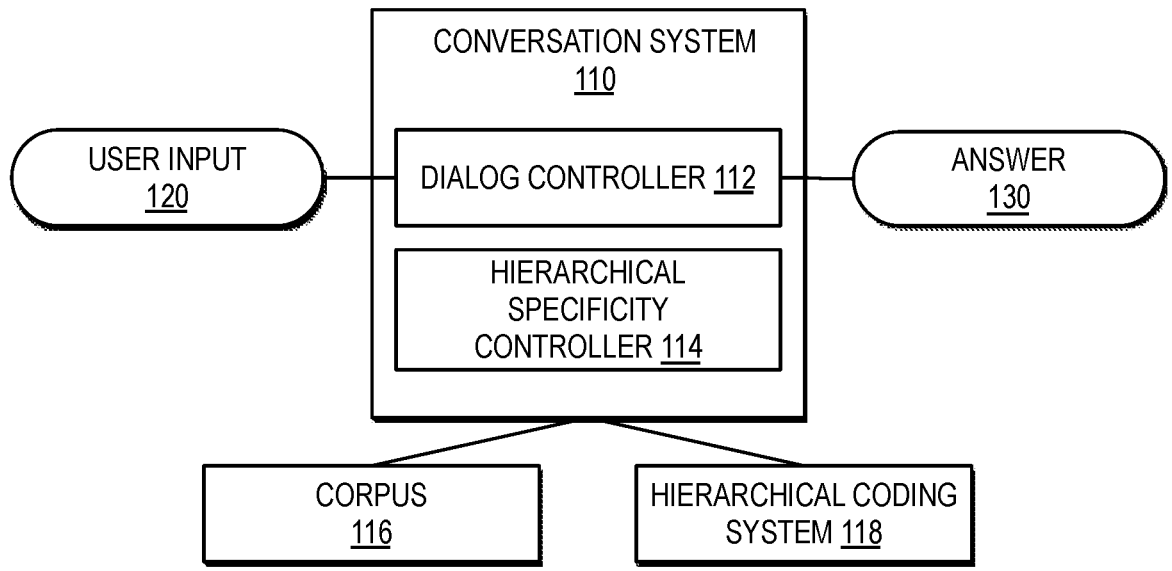
FIG. 1 illustrates a block diagram of one example of a natural language processing (NLP) conversation system for automatically refining application of a hierarchical coding system to optimize conversation system dialog-based responses to a user.

FIG. 1 illustrates one example of a block diagram of a natural language processing (NLP) conversation system for automatically refining application of a hierarchical coding system to optimize conversation system dialog-based responses to a user.

In one example, a natural language processing (NLP) based conversation system 110 receives a user input 120 from one or more users. In one example, user input 120 is received from a user, where a user represents one or more of a human and an automated user.

In one example, user input 120 includes a string of text that represents a natural language input. In another example, if user input 120 is not in plain text, conversation system 110 may apply an input recognizer and decoder for converting the input into plain text representing a natural language input such as, but not limited to, converting speech to text, converting a gesture to text, and converting handwriting to text.

In one example, the natural language input of user input 120 includes a string of text in a sentence structure associated with a question. In another example, natural language question 112 includes a string of text with elements that effectively present a query. In another example, the string of text in natural language question 112 represents a string of text elements in one or more other natural human language formats.

In one example, conversation system 110 represents a cognitive computing system that supports an automated mechanism for responding to the natural language input of user input 120 through NLP techniques that facilitate the exchange of information with users who submit inputs in a natural language through a dialog interface. In one example, conversation system 110 may represent a conversational agent, such as a chat bot, that responds to user input 120 through NLP techniques that extract the intention of the user entering the input and extract other relevant information from the input to understand the user and determine a response.

In one embodiment, in response to receiving user input 120, to support automated responses to a subject matter in user input 120, a dialog controller 112 of conversation system 110 analyzes user input 120 and produces an output of answer 130 for output to a dialog interface accessible to the user. In one example, dialog controller 112 extracts an intent of the text of user input 120, extracts other relevant information from the text, and determines a lexical answer type. In one example, the lexical answer type is determined from words within user input 120 that indicate the type of entity that is being requested. In one example, answer 130 is generated by a computer system based on a goal of dialog controller 112 to provide a response to the extracted intent of the user query that is returned in a dialog format, reflecting syntax, sentiment and other language constraints of the type of dialog that a human may generate to the user query, but generated by an artificial intelligence-based application. For example, dialog controller 112 analyzes the text of user input 120 through a natural language understanding unit which may include one or more components for analyzing different aspect of natural language understanding including, but is not limited to, Proper Name identification, part of speech tagging, and semantic parsing.

In one example, machine learning plays a central role in artificial intelligence-based applications that interact with one or more NLP system, such as NLP-based conversation system 110. Generally, NLP supports the parsing and semantic interpretation of text, allowing computers to learn, analyze and understand human language. NLP can be trained to extract hundreds of types of information from textual data accessed from a corpus 116 of one or more documents including one or more of structured and unstructured text. Each NLP system has its own corpus 116 of language and domain that it bootstraps with, where the corpora gives ability to models to understand language, grammar and terminologies of a certain domain. One of the primary outcomes of the process of creating and training a machine learning environment using corpus 116 is a data object, referred to as a model, built from sample inputs. In one example, a dialog controller 112 includes one or more models, each representing a data object of a machine learning environment. According an advantage of the present invention, a data object in a machine learning environment supports automated natural language processing and text classification analysis of volumes of text that are so large, such as millions of words and phrases in petabytes of textual data, that a person attempting to structure, clean, and gain insights from the same volumes of text in corpus 116 would require years of work to reach a same conclusion that machine learning based data objects are capable of performing in increments of a second or less, and likely with a greater accuracy than could be performed by a person having to process the same volume of information.

In one example, the precision at which dialog controller 112 provides information in answer 130 to meet the intent of a query in user input 120 is impacted by one or more factors including, but not limited to, the level of specificity of the query in user input 120 and the precision and predictability of the corpus of knowledge on which dialog controller 112 bases answers. In one example, a corpus of knowledge may be focused to provide a class of answers for a particular domain of information. For example, in some domains of information provided through a dialog, in addition to corpus 116, the corpus of knowledge that dialog controller 112 applies to respond to queries is organized in a hierarchical coding system, such as hierarchical coding system 118, where the level of specificity of a user query may impact the level of concepts in the hierarchy that are identified as responsive to the user intent and the precision and predictability of traversal of the organization of the tree of concepts impacts the determination of information that is meaningful to meet the intent of the query.

In one example, hierarchical coding system 118 is a model trained to support a tree of concepts that have an established hierarchy of relationships to one another where a child concept is a refinement of a parent concept and each concept is mapped to a code, such as a unique string or integer, that identify the concept type within the hierarchy. In one example, hierarchical coding system 118 represents a model that is trained to reflect the established hierarchy of a domain of information focused on an industry-specific coding system, such as, but not limited to, International Classification of Diseases (ICD)-9, International Classification of Diseases (ICD)-10, and SNOMED CT for medical concepts. In another example, hierarchical coding system 118 represents a model that is trained to reflect a domain of information for any ontology defined for any industry or use case that includes a hierarchy of concepts mapped to unique identifiers. In the example, hierarchical coding system 118 may be updated over time, as the concepts in the underlying hierarchy of concepts mapped to unique identifiers are updated or change.

In an example, a user with an intent to request a dialog of information under a medical domain may request information about medical trials for cancer patients. In one example, the user may input an utterance "A" of "I am a cancer patient—can you help me find some trials?", which is more general. In another example, the user may input an utterance "B" of "I have stage 3 small cell squamous lung cancer and I need a trial", which is more specific, identifying a particular type of cancer related to the request for information about trials. In the example, if both utterances were applied to hierarchical coding system 118, an application of the more general utterance "A" to hierarchical coding system 118 would likely yield a large number of results regarding all types of trials identified for cancer patients, including all child and sub-child concepts related to an initial parent concept of cancer treatments, to drive a dialog towards only the selection of child or sub-child concepts that would result from an application of more specific utterance "B".

According to an advantage of the present invention, conversation system 110 includes a hierarchical specificity controller 114 for managing application of hierarchical coding system 118 to identify the level of specificity of an initial query in user input 120, to improve the precision of information collected from hierarchical coding system 118 to match the intent of user input 120, and return an optimal answer set to the user's initial intent. In one example, hierarchical specificity controller 114 optimizes the query received in user input 120 to refine the inputs in user input 120 applied to hierarchical coding system 118 to a meaningful level of specificity, resulting in an optimal minimum answer set to the user's initial intent in user input 120.

According to advantage of the invention, in the example of a general utterance "A" and a more specific utterance "B" with a same user intent, hierarchical specificity controller 114 requests that a user refine inputs in response to the user entering utterance "A", to determine an optimal minimum answer set rather than returning a large volume of information about all types of trials, for both dynamic and static corpus and hierarchical coding systems. In the example, without hierarchical specificity controller 114 managing prompts to a user to make inputs more specific, given that the user may be trying learn new information from the dialog, with or without a large volume of information returned in response to the an initial general utterance "A", the user may not have the knowledge as to what additional information to include in an additional query that would be meaningful for focusing the path taken in hierarchical coding system 118, and in return reduce the number of results returned by hierarchical coding system 118 to the narrower scope of results for a query such as would be returned for utterance "B". In one example, while dialog controller 112 may independently include a set of rules for a script to prompt a user to provide more specific information to narrow a path, as programmed by a developer, even with static domain paths within hierarchical coding system 118, the precision of the outcomes from applying rules for directing a script is still dependent upon the precision of natural language inputs and user knowledge of the subject area to choose the direction of a path. In addition, if hierarchical coding system 118 includes a corpus of answers that is dynamic, a set of rules for a script that are pre-programmed by a developer may not function correctly on a dynamic corpus.

Figure 2:
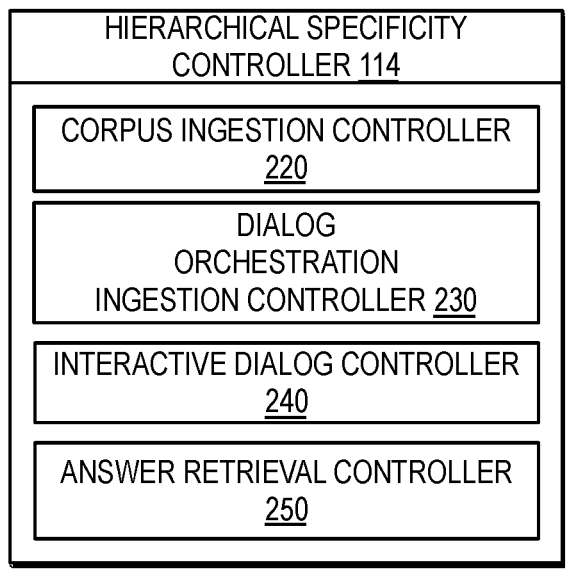
FIG. 2 illustrates a block diagram of one example of a hierarchical specificity controller for managing application of a hierarchical coding system to result in an optimal minimum answer set to a user's initial intent in a conversation dialog.

FIG. 2 illustrates a block diagram of one example of a hierarchical specificity controller for managing application of a hierarchical coding system to result in an optimal minimum answer set to a user's initial intent in a conversation dialog.

In one example, hierarchical specificity controller 114 manages application of a hierarchical coding system by applying one or more sub-processes through one or more of a corpus ingestion controller 220, a dialog orchestration ingestion controller 230, and interactive dialog controller 240, and an answer retrieval controller 250. In additional or alternate embodiments, hierarchical specificity controller 114 may include additional or alternate controllers and components.

In one embodiment, corpus ingestion controller 220 applies hierarchical coding system 118 to a specific corpus of knowledge, such as all or a portion of corpus 116 focused on a domain of information to support a particular class of answers, to generate an ingested corpus that is more efficiently searchable. Next, dialog orchestration ingestion controller 230, if applicable, interrogates hierarchical coding system 118 to create a fast access, metadata based orchestration layer and conversational workspace for guiding dialog with the user based on the definition of the coding system hierarchy. In one embodiment, hierarchical specificity controller 114 runs congestion ingestion controller 220 and dialog orchestration ingestion controller 230 prior to runtime of dialog controller 112 managing dialog in response to user inputs. In addition, hierarchical specificity controller 114 may periodically run congestion ingestion controller 220 and dialog orchestration ingestion controller 230 over specified time intervals or in response to receiving new information. In another embodiment, hierarchical specificity controller 114 may run at runtime in response to a particular user input with a query for information in a particular domain.

Interactive dialog controller 240 applies the orchestration layer and conversational workspace generated for hierarchical coding system 118 to drive further refinement of the query presented in user input 120. Answer retrieval controller 250 interacts with corpus ingestion controller 220 and dialog orchestration ingestion controller 230 to provide an optimal answer set based on the ingested corpus. In one embodiment, interactive dialog controller 240 and answer retrieval controller 250 run at runtime and access data applied by congestion ingestion controller 220 and dialog orchestration ingestion controller 230.

Figure 3:
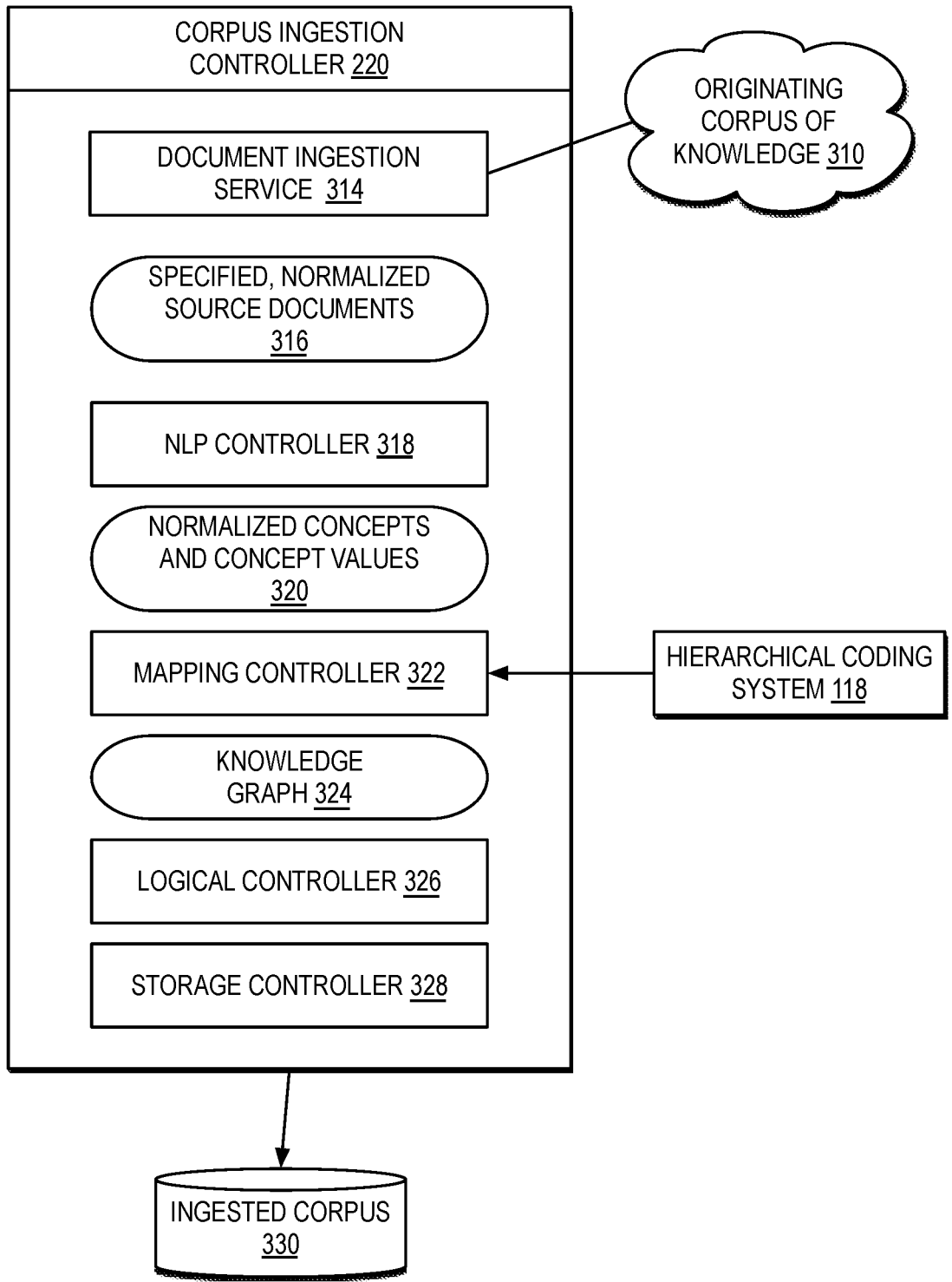
FIG. 3 illustrates a block diagram of one example of a corpus ingestion controller for applying a hierarchical coding system to a corpus of knowledge for a class of answers.

FIG. 3 illustrates a block diagram of one example of a corpus ingestion controller for applying a hierarchical coding system to a corpus of knowledge for a class of answers.

In one embodiment, for conversation system 110 to perform in an expected manner for a class of answers, a corpus ingestion controller 220 applies hierarchical coding system 118 to an originating corpus of knowledge 310, such as all or a portion of corpus 116, prior to runtime of conversation system 110 for managing user dialog in a particular domain of information to produce a particular class of answers. In addition, conversation system 110 may periodically reinvoke corpus ingestion controller 220 if originating corpus of knowledge 310 or hierarchical coding system 118 are updated or according to a schedule.

For corpus ingestion controller 220 to apply hierarchical coding system 118 to originating corpus of knowledge 310, a document ingestion service 314 of corpus ingestion controller 220 performs an initial ingestion of corpus of knowledge 310. Document ingestion service 314 may search one or more sources for documents to gather in originating corpus of knowledge 310. In one example, corpus of knowledge 310 includes unstructured content, such as unstructured documents, gathered from one or more sources. In one example, unstructured content represents data that has not yet been stored within a structure, such as a database. In addition, corpus of knowledge 310 may include structured content, such as content gathered into a structure, such as a database.

Document ingestion service 314 parses out a selection of sections from the source documents of originating corpus of knowledge 310 that are of value to the domain of information focused on in hierarchical coding system 118. In addition, document, ingestion service 314 normalizes the structures of the selection of documents for additional processing. Document ingestion service 314 passes the selection of sections with normalized structures as specified, normalized source documents 316.

A natural language processing (NLP) controller 318 of corpus ingestion controller 220 receives specified, normalized source documents 316 and applies one or more natural language processing functions on the documents within specified, normalized source documents 316 to execute concept and concept-value detection against the unstructured content within specified, normalized source documents 316. For example, NLP controller 318 passes the selection of concept and concept-values detected in the unstructured content within specified, normalized source documents 316 as normalized concepts and concept values 320. For example, if a selection of sections ingested into specified, normalized source documents 316 describes "Target population is stage IV lung cancer patients with metastasis to the bone", then NLP controller 318 detects the concept "condition" with a concept value of "lung cancer".

According to an advantage of the present invention, a mapping controller 322 of corpus ingestion controller 220 maps normalized concept and concept-values 320 to the hierarchical concepts and code identifiers of a standardized hierarchical coding system with an existing, inherent hierarchical relationship. For example, mapping controller 322 maps normalized concepts and concept values 320 to hierarchical coding system 118. By mapping the concept and concept values of normalized concepts and concept values 320 with the code identifiers assigned to matching hierarchical concepts in a standardized hierarchical coding system, mapping controller 322 builds a knowledge graph 324 of source document sections from specified, normalized source documents that are labeled with concepts and concept values in normalized concept and concept values 320, and further mapped to hierarchical coding system 118, which is stronger than would be provided by the concepts and concept values in normalized concept and concept values 320 alone.

For example, for the concept "condition" and the concept value "lung cancer" of a source document in normalized concept and concept values 320, mapping controller 322 may map the concept and concept value to hierarchical coding system 118 with hierarchical relationships for a domain of information of medical concepts using ICD-9 medical concept terminology. In the example, mapping controller 322 maps "lung cancer" to a code "00320040", which represents the standard code for the hierarchical concept of lung cancer according to ICD-9 medical concept terminology. In the example, the code for "lung cancer" in hierarchical coding system 118 is in a hierarchy of codes that understands that "cancer" as a child of "condition and "lung cancer" as a child of "cancer" in the hierarchy, but "lung cancer" is also a parent in the hierarchy that includes child subtypes of "non-small cell lung cancer" and "small cell lung cancer". In addition, each of the child subtypes may in turn be parents of further hierarchies of subtypes, such as "squamous" and "non-squamous".

In one embodiment, logical controller 326 of corpus ingestion controller 220 may perform additional steps to manage mapping of normalized concepts and concept values 320 to document sources in knowledge graph 324. In one example, logical controller 326 may apply logical reasoning around other parts of speech in the unstructured text of specified, normalized source documents 316 to detect and apply negation within knowledge graph 324. For example, logical controller 326 may detect parts of speech indicating that unstructured text is directed to a positive of a concept value or a negative of a concept value. For example, logical controller 326 detects that in a sentence that states "Target population is stage IV lung cancer patients with metastatis to the bone" the part of speech of "with" indicates mapping a positive concept value of "lung cancer" as distinguished from in a sentence that states "Target population is stage IV lung cancer patients without metastatis to the bone" the part of speech of "without" indicates mapping a negative concept value of "lung cancer". In another embodiment, logical controller 326 may apply logical reasoning to determine if a combination of elements detected, such as the combination of concepts, negation, or other elements, should result in altering or enhancing the codes mapped to the document source.

In the example, a storage controller 328 of corpus ingestion controller 220 manages the storage of all the processing performed by document ingestion service 314, NLP controller 318, mapping controller 322, and logical controller 326, as reflected in specified, normalized source documents 316, normalized concepts and concept values 320, and mapped coding from hierarchical code system 118 in knowledge graph 324, into an ingested corpus 330. In one example, storage controller 328 manages storage of ingested corpus 330 in a database, index, or other storage structure available for efficiently managing the size and complexity of the knowledge base of information.

Figure 4:
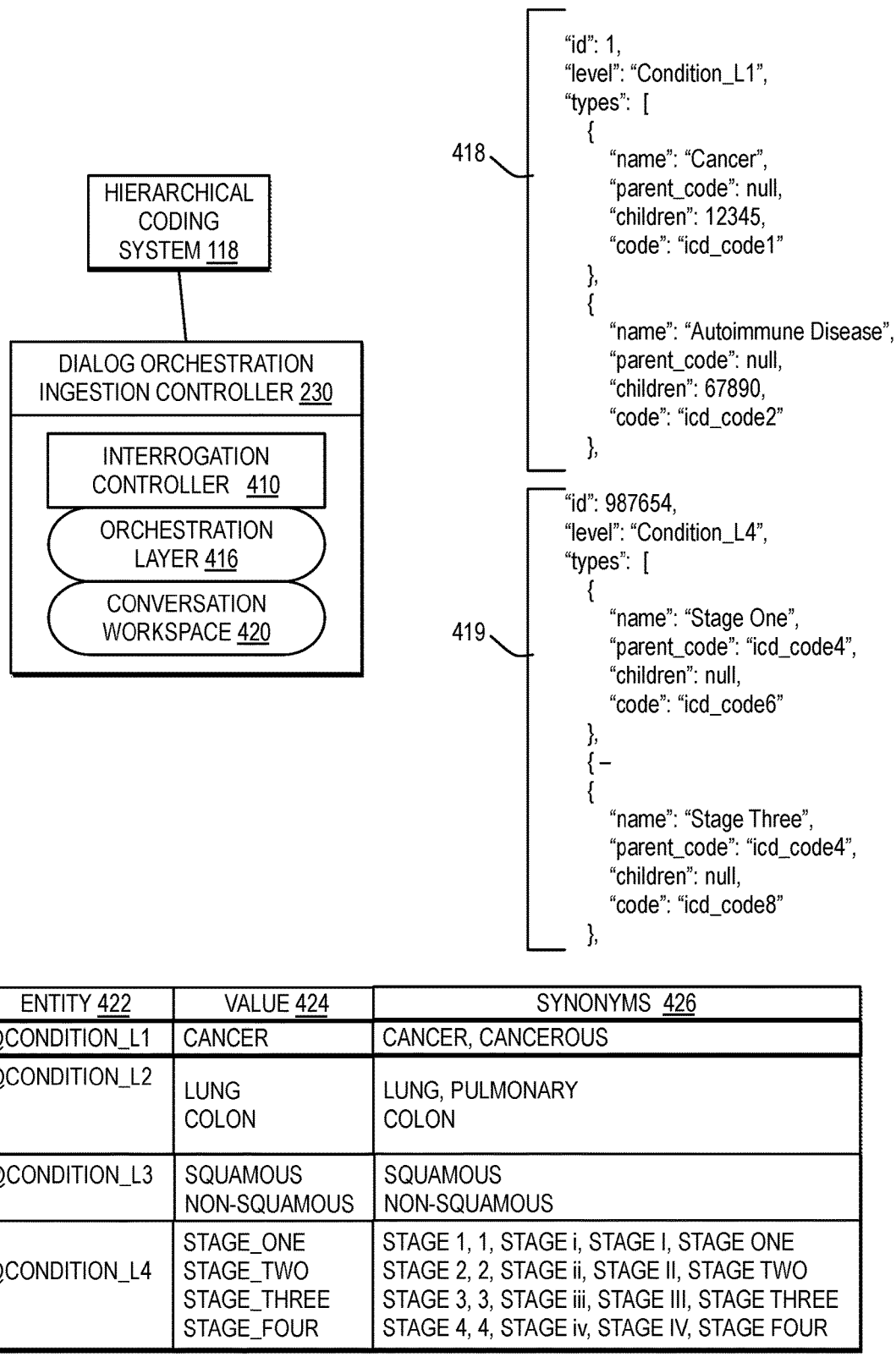
FIG. 4 illustrates a block diagram of one example of a dialog orchestration ingestion controller for ingesting a hierarchical coding system into an orchestration layer for application by a conversation system at runtime.

FIG. 4 illustrates a block diagram of one example of a dialog orchestration ingestion controller for ingesting a hierarchical coding system into an orchestration layer for application by a conversation system at runtime.

In one example, dialog orchestration ingestion controller 230 applies an interrogation controller 410 for interrogating hierarchical coding system 118.

In the example, interrogation controller 410 interrogates hierarchical coding system 118 to define fast access metadata for flattening the hierarchy to create metadata for an orchestration layer 416 that can be leveraged by hierarchical specificity controller 114 at runtime of dialog controller 112 in an interactive dialog with the user.

In the example illustrated in FIG. 4, one example of data generated in orchestration layer 416 includes metadata that flattens the hierarchy through identifying each hierarchical node path by an identifier "id", where each id associated with an identifier of a "level" indicating an entity name, and further defined by the types of child nodes, each identified by a "name" that represents a value, a "parent code" identifying the "id" of a parent node, a "children" identifying the "id" of a child node, and the "code" identifying the hierarchical code value assigned to the "name" value in hierarchical coding system 118. For example, as illustrated at reference numeral 418, the metadata flattening a top node of hierarchical coding system 118, with an "id" of "1" includes a "level" identified as entity "Condition_L1", with a first type flattened to metadata of a name value of "Cancer", a parent code of "null" indicating the node is a top node in the hierarchy, a "children" value identifying an "id" of "12345" as a child node, and a "code" value identifying the hierarchical code value of "icd_code1" assigned to the first type, and a second type flattened to metadata of a name value of "Autoimmune Disease", a parent code of "null" indicating the node is a top node in the hierarchy, a "children" value identifying an "id" of "67890" as a child node, and a "code" value identifying the hierarchical code value of "icd_code2" assigned to the second type. In addition, for example, as illustrated at reference numeral 419, the metadata flattening another node in hierarchical coding system 118, with an "id" of "987654" includes a "level" identified as entity "Condition_L4", with a first type flattened to metadata of a name value of "Stage One", a parent code of "icd_code4" indicating the code of the parent node in the hierarchy, a "children" value of null indicating the last of a path, and a "code" value identifying the hierarchical code value of "icd_code6" assigned to the first type, and a second type flattened to metadata of a name value of "Stage Three", a parent code of "icd_code4" indicating the code of the parent node in the hierarchy, a "children" value of null indicating the last of a path, and a "code" value identifying the hierarchical code value of "icd_code8" assigned to the second type.

In the example, interrogation controller 410 also interrogates hierarchical coding system 118 to extract the values and surface forms of each element in hierarchical coding system 118 and to generate a conversation workspace 420 of the entities for hierarchical specificity controller 114 to look to in detecting context of an intent in hierarchical coding system 118 for a dialog with the user at runtime.

In the example illustrated in FIG. 4, one example of data generated in conversation workspace 420 includes each entity 422 in conversation workspace 420 and interrogation controller 410 identifies a value 424 and a synonym 424 based on the values and surface forms available in hierarchical coding system 118. For example, as illustrated at reference numeral 430, for an entity of "condition_L1", interrogation controller 410 extracts a value of "cancer" and identifies surface forms in the forms of the synonyms "cancer" and "cancerous". In another example, as illustrated at reference numeral 432, for an entity of "condition_L2", interrogation controller 410 extracts values of "lung" and "colon" and identifies surface forms in the forms of the synonyms "lung" and "pulmonary" for "lung" and "colon" for "colon". In one example, as illustrated at reference numeral 434, for an entity of "condition_L3", interrogation controller 410 extracts values of "squamous" and "non-squamous" and identifies surface forms in the forms of the synonyms "squamous" for "squamous" and "non-squamous" for "non-squamous". In one example, as illustrated at reference numeral 436, for an entity of "condition_L4", interrogation controller 410 extracts values of "stage_one", "stage_two", "stage_three", and "stage_four" and identifies surface forms in the forms of the synonyms "stage 1, 1, stage i, stage I, stage_one" for "stage_one", "stage 2, 2, stage ii, stage II, stage_two" for "stage_two", "stage 3, 3, stage iii, stage III, stage_three" for "stage_three", and "stage 4, 4, stage iv, stage IV, stage four" for "stage_four".

Figure 5:
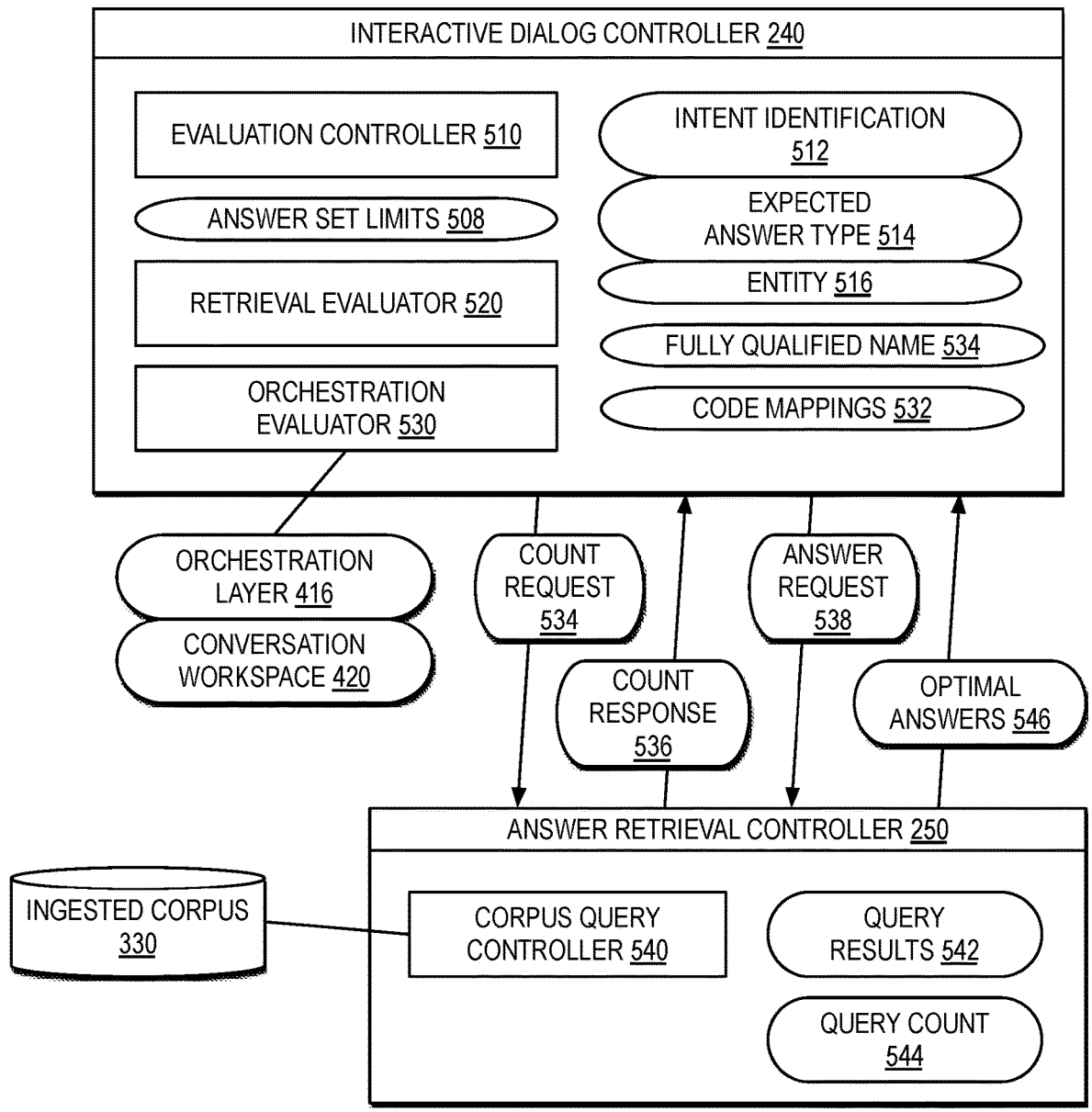
FIG. 5 illustrates a block diagram of one example of an interactive dialog controller and answer retrieval controller for supporting a dialog controller in applying a hierarchical coding system at runtime to select answers returned in an answer dialog to a user.

FIG. 5 illustrates a block diagram of one example of an interactive dialog controller and answer retrieval controller for supporting a dialog controller in applying a hierarchical coding system at runtime to select answers returned in an answer dialog to a user.

In the example, when a user engages a dialog managed by conversation system 110 by submitting user input 120, dialog controller 112 initially determines one or more intents of user input 120, such as an intent identification 512, and an expected longitudinal answer type, such as an expected answer type 514. In the example, if hierarchical specificity controller 112 evaluates the intent of the input is directed to answers informed by hierarchical coding system 118, hierarchical specificity controller 112 may trigger interactive dialog controller 240 to evaluate whether to drive a dialog with the user to request more refining input from the user for application of hierarchical coding system 118. In the example, if hierarchical specificity controller 112 is triggered to evaluate whether to drive a dialog with the user to request more refining input from the user for application of hierarchical coding system 118, then hierarchical specificity controller 112 may first determine whether one or more of corpus ingestion controller 220 and dialog orchestration ingestion controller 230 need to be triggered to generate one or more of ingested corpus 330, orchestration layer 416, and conversation workspace 420.

In the example, interactive dialog controller 240 includes an orchestration evaluator 530 which extracts initial values from user input and evaluates the values against conversation workspace 420 to determine an entity 516. For example, for user input 120 of an utterance "A" of "I am a cancer patient—can you help me find some trials", hierarchical specificity controller 112 evaluates an intent of "#find_trials", which dialog controller 112 evaluates as directing use of the medical concepts in hierarchical coding system 118 and triggers interactive dialog controller 240. Orchestration evaluator 530 evaluates that the value of "cancer" in user input 120 correlates and entity "@condition_L1: cancer", based on entries in conversation workspace 420. In addition, orchestration evaluator 530 evaluates the initial prefix value of entity 516 in orchestration layer 416 of "cancer condition" and set a fully qualified name ($FQ_NAME) 534 to "cancer condition". In one example, fully qualified name 534 represents all the prefix name values in a hierarchic sequence correlating with the hierarchy of hierarchical coding system 118 as flattened into orchestration layer 416, and evaluated from a sequence of user inputs.

In one embodiment, interactive dialog controller 240 includes an evaluation controller 510 to evaluate intent identification 512, expected answer type 514, entity 516, and fully qualified name 534 and determine whether the user has provided sufficient context in the user input to reach a refined level of answer that meets expected answer type 514 for the intent in intent identification 512, or whether to drive a dialog with the user to gather input to refine the level of answer.

In one embodiment, to quickly evaluate whether the user has provided sufficient context in the user input to reach a refined level of answer that meets expected answer type 514, a retrieval evaluator 520 of interactive dialog controller 240 may engage answer retrieval controller 250 by sending a count request 534, requesting a count of a number of answers the present context of intent identification 512 and fully qualified name 534 would result in when applied to hierarchical coding system 118. Answer retrieval controller 250 evaluates intent identification 512 and fully qualified name 534 on ingested corpus 330 and collects the answers along one or more paths relevant to the context into query results 542. In one example, answer retrieval controller 250 calculates a query count 544 of a number of answers in query results 542 and returns query count 544 as count response 536 to interactive dialog controller 240. In the example, retrieval evaluator 520 determines whether the count returned by answer retrieval controller 250 in count response 536 is less than a limit set in answer set limits 508. If the count in count response 536 is less than the limit set in answer set limits 508, then retrieval evaluator 250 sends an answer request 538 and requests answer retrieval controller 250 to return the current selection of results determined in query results 542. If the count in count response 536 is greater than or equal to the limit set in answer set limits 508, then answer retrieval evaluator 250 directs orchestration evaluator 530 to perform additional evaluations.

In one embodiment, orchestration evaluator 530 leverages orchestration layer 416 and conversation workspace 420 to evaluate whether the current entity found in context 516 is at a leaf node level as mapped in orchestration layer 416. In the example, if the current entity is not at a leaf node level, then orchestration evaluator 530 evaluates a specific next level of input that could be requested from the user based on the mappings in conversation workspace 420 and triggers dialog controller 112 to request the user respond to the specific next level of input for the value in fully qualified name 534. In the example, if the current entity is at a leaf node level, then orchestration evaluator 530 sets code mappings 532 to the code ID for the leaf node from orchestration layer 416 and directs answer retrieval controller 250 to evaluate a response based on the code ID in code mappings 532, passed to answer retrieval controller 250 as answer request 538. In the example, corpus query controller 540 evaluates ingested corpus 330 based on the code set in answer request 538 and returns a set of optimal answers 546 evaluated from ingested corpus 330. In the example, by searching ingested corpus 330 with the code ID for the leaf node, where ingested corpus 330 is already mapped with the code ID, interactive dialog controller 240 efficiently requests the narrowest selection of answers meeting the original intent identified in intent identification 512.

In the example, interactive dialog controller 240 repeats the steps performed by retrieval evaluator 520 and orchestration evaluator 530 until orchestration evaluator 530 determines that at least one of the answer set in optimal answers 546 is sufficiently small, based on answer set limits 508, or the dialog driven by hierarchical coding system 118 has reached a leaf node and no further refinement is available.

In response to interactive dialog controller 240 completing the steps performed by retrieval evaluator 520 and orchestration evaluator 530, interactive dialog controller 240 returns the final selection of optimal answers 546 to dialog controller 112 to return to the user as answer 130.

FIG. 6 illustrates one example of a block diagram of an interactive dialog controller and answer retrieval controller for applying a first level a hierarchical coding system at runtime to determine which answers to return in an answer dialog to a user.

In one example, a user engages with conversation system 110 through a user interface 602. In one example, a user input 604 within user interface 602 of conversation system 110 is "I am a cancer patient—can you help me find some trials?" and an answer 606 by conversation system 110 is "What type of cancer? Options-Lung-Colon". In particular, in the example, in response to the user engaging conversation system 110 with user input 604, dialog controller 112 assesses an intent, such as intents 612 of "#find_trials", and an expected longitudinal answer type. In the example, based on the intent, dialog controller 112 engages hierarchy specificity controller 114 to use a medical based hierarchical coding system for hierarchical coding system 118. In the example, as illustrated at reference numeral 620, hierarchy specificity controller 114 identifies the starting context within the medical based hierarchical coding system of the entity "@Condition_L1:Cancer" within a conversational workspace 420 generated for hierarchical coding system 118 and initially identifies $FQ_NAME 614 of "condition" within the metadata of orchestration layer 416. In one example, in response to identifying the starting context within the medical based hierarchy coding system of the entity "@Condition_L1:Cancer", as illustrated at reference numeral 620, interactive dialog controller 240 uses metadata of orchestration layer 416 to find a path for the hi/lo condition levels in the utterance, starting with "@condition_L1:cancer, level:1, value:cancer" within the medical based hierarchical coding system, and determines that the metadata shows that the lo_level entry has children. In the example, as illustrated at reference numeral 630, interactive dialog controller 240 queries answer retrieval controller 250 for metadata of orchestration layer 416 for the current level in the path starting with the hi level and receives a response indicating that the child levels have metadata. In response to detecting the child levels have metadata, as illustrated at reference numeral 640, interactive dialog controller 240 sets "$FQ_name" to the prefix value of the node of "cancer" and sets the "FQ_complete" to "false", indicating that a next level of refinement that could be requested as input from the user is clarification of which value for entity "@condition_L2" the user is requesting information about, from among the values of "lung" and "colon".

Although not illustrated in FIG. 6, interactive dialog controller 240 may also engage answer retrieval controller 250 to request a count of the answers the context of "@Condition_L1:Cancer" would result in within a medical based hierarchy coding system and determine if the result set size is small enough to respond to the user immediately or if further refinement of the request is recommended.

Figure 7:
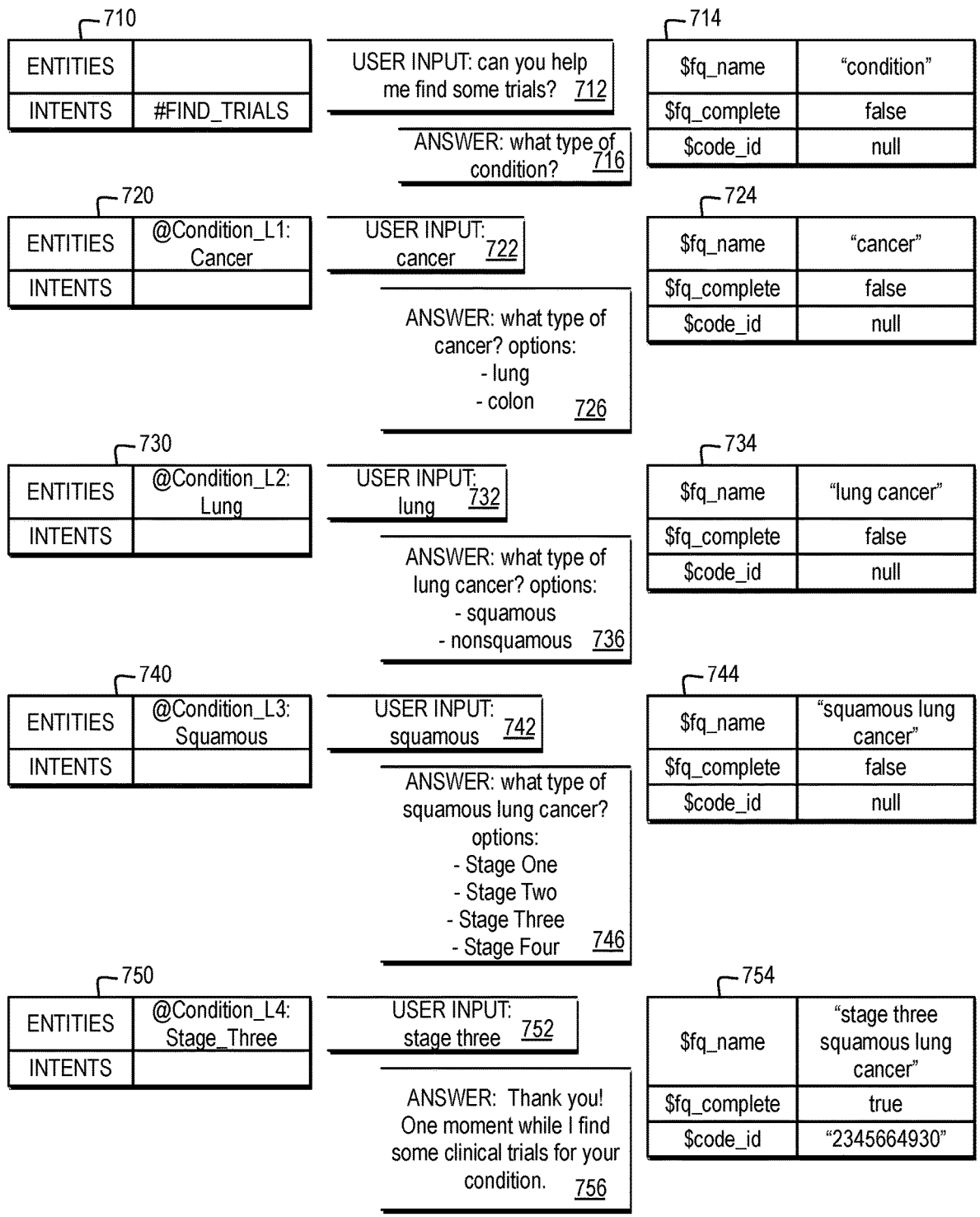
FIG. 7 illustrates one example of a block diagram of an interactive dialog controller and answer retrieval controller for applying a hierarchical coding system at runtime to determine which answers to return in an answer dialog to a user to request that user refine the focus of an intent.

FIG. 7 illustrates one example of a block diagram of an interactive dialog controller and answer retrieval controller for applying a hierarchical coding system at runtime to determine which answers to return in an answer dialog to a user to request that user refine the focus of an intent.

In the example, as illustrated at reference numeral 710, dialog controller 112 initial identifies an intent of "#FIND_TRIALS" from a user input 712 of "can you help me find some trials?". Hierarchical specificity controller 114 identifies that the intent of "#FIND_TRIALS" triggers use of orchestration layer 416 as illustrated in FIG. 4. In the example, as illustrated at reference numeral 714, interactive dialog controller 240 evaluates "#FIND_TRIALS" in orchestration layer 416 and identifies an "$FQ_NAME" of "condition", an "$FQ_complete" of "false", a "$code_ID" of "null", and returns an answer 716 of "what type of condition?", requesting further clarification of a type of medical condition. In one example, "$FQ_complete" provides an indicator of whether the discovered path in an orchestration layer has reached a leaf node.

In the example, as illustrated at reference numeral 720, by evaluating conversational workspace 420, hierarchy specificity controller 114 identifies an entity of "@condition_L1: Cancer" based on a user input 722 of "cancer". In the example, as illustrated at reference numeral 724, interactive dialog controller 240 evaluates within orchestration layer 418 that "cancer" has a child node and identifies an "$FQ_NAME" of "cancer", an "$FQ_complete" of "false", a "$code_ID" of "null", and drivers further refinement by returning an answer 726 of "what type of cancer? Options:—lung-colon", requesting further clarification of a type of cancer.

In the example, as illustrated at reference numeral 730, by evaluating conversational workspace 420, hierarchy specificity controller 114 identifies an entity of "@condition_L2: Lung" based on a user input 732 of "lung". In the example, as illustrated at reference numeral 734, interactive dialog controller 240 evaluates within orchestration layer 418 that "lung" has a child node and identifies an "$FQ_NAME" of "lung cancer", an "$FQ_complete" of "false", a "$code_ID" of "null", and drives further refinement by returning an answer 736 of "what type of lung cancer? Options:—squamous-nonsquamous", requesting further clarification of a type of lung cancer.

In the example, as illustrated at reference numeral 740, by evaluating conversational workspace 420, hierarchy specificity controller 114 identifies an entity of "@condition_L3: Squamous" based on a user input 732 of "squamous". In the example, as illustrated at reference numeral 734, interactive dialog controller 240 evaluates within orchestration layer 418 that "squamous" has a child node and identifies an "$FQ_NAME" of "squamous lung cancer", an "$FQ_complete" of "false", a "$code_ID" of "null", and drives further refinement by returning an answer 736 of "what type of squamous lung cancer? Options:—Stage One-Stage Two-Stage Three-Stage Four", requesting further clarification of a type of squamous lung cancer.

In the example, as illustrated at reference numeral 750, by evaluating conversational workspace 420, hierarchy specificity controller 114 identifies an entity of "@condition_L4: Stage_Three" based on a user input 752 of "stage_three". In the example, as illustrated at reference numeral 754, interactive dialog controller 240 evaluates within orchestration layer 418 that "stage_three" has a child node and identifies an "$FQ_NAME" of "stage_three squamous lung cancer", an "$FQ_complete" of "true", a "$code_ID" of "2345664930", and completes the drive for refinement by returning an answer 726 of "Thank you! One moment while I find some clinical trials for your condition", while answer retrieval controller 250 evaluates answers for "$code_ID" of "2345664930".

Figure 8:
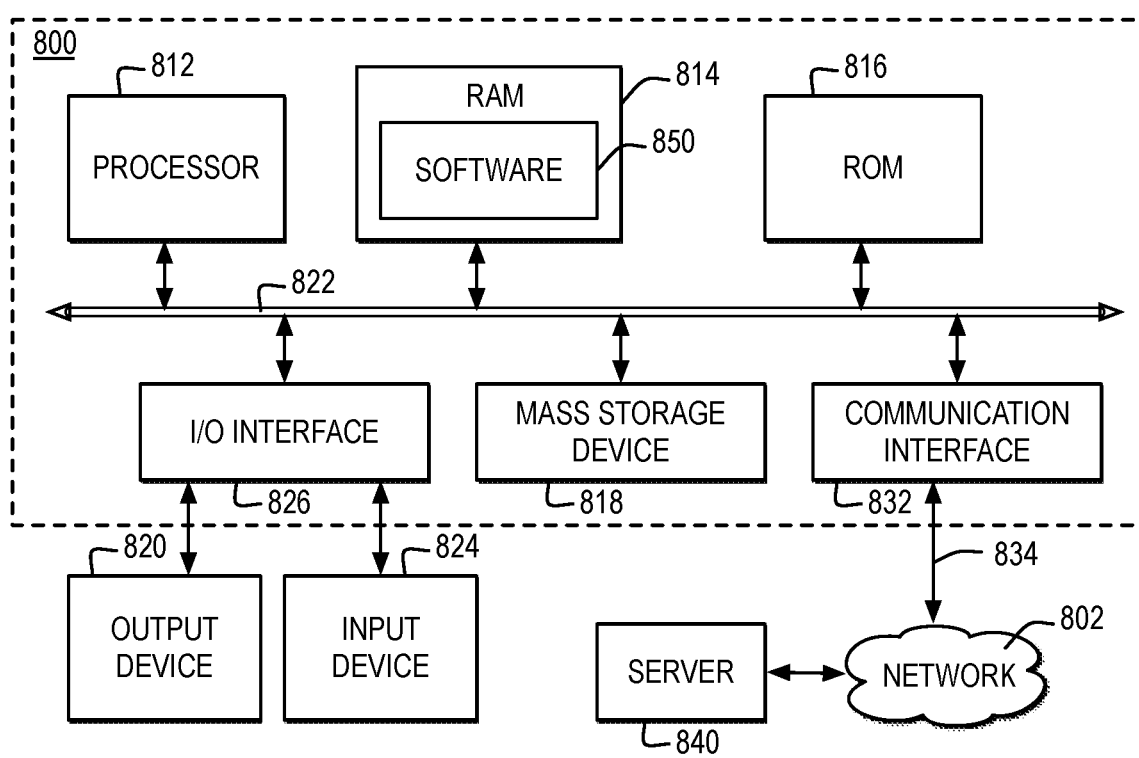
FIG. 8 illustrates one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony-based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

In one embodiment, the operations performed by processor 812 may control the operations of flowchart of FIGS. 9-13 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowchart in FIGS. 9-13.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions; instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figures 9, 10:
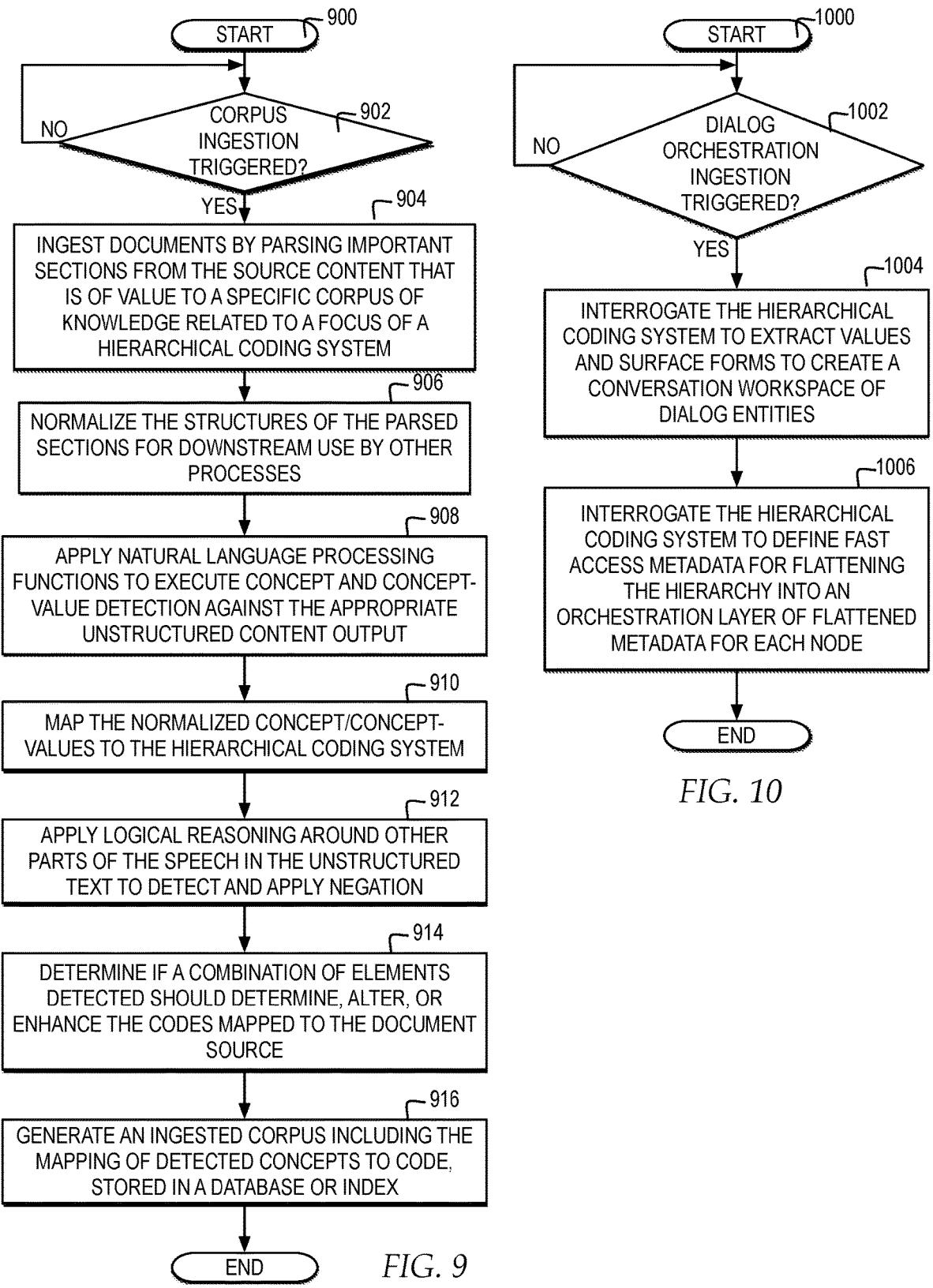
FIG. 9 illustrates a high-level logic flowchart of a process and computer program for applying a hierarchical coding system to a corpus of knowledge for a class of answers to generate an ingested corpus for application by a conversation system.
FIG. 10 illustrates a high-level logic flowchart of a process and computer program for ingesting a hierarchical coding system into an orchestration layer for application by a conversation system.

FIG. 9 illustrates a high-level logic flowchart of a process and computer program for applying a hierarchical coding system to a corpus of knowledge for a class of answers to generate an ingested corpus for application by a conversation system.

In one example, the process and computer program start at block 900 and thereafter proceed to block 902. Block 902 illustrates a determination whether corpus ingestion is triggered. In one example, corpus ingestion may be triggered by a conversation system before or during runtime.

At block 902, if corpus ingestion is triggered, then the process passes to block 904. Block 904 illustrates ingesting documents by parsing important sections from the source content that is of value to a specific corpus of knowledge related to a focus of a hierarchical coding system. Next, block 906 illustrates normalizing the structures of the parts sections for downstream used by other processes. Thereafter, block 908 illustrates applying natural language processing functions to execute concept and concept value detection against the appropriate unstructured content output. Next, block 910 illustrates mapping the normalized concept and concept values to a hierarchical coding system. Thereafter, block 912 illustrates applying logical reasoning around other parts of the speech in the unstructured text to detect and apply negation. Next, block 914 illustrates determining if a combination of elements detected should determine, alter, or enhance the codes mapped to the document source. Thereafter, block 916 illustrates generating an ingested corpus including the mapping of detected concepts to code, stored in a database or index, and the process ends.

FIG. 10 illustrates a high-level logic flowchart of a process and computer program for ingesting a hierarchical coding system into an orchestration layer for application by a conversation system.

In one example, the process and computer program start at block 900 and thereafter proceed to block 1002. Block 1002 illustrates a determination whether dialog orchestration ingestion is triggered. In one example, dialog orchestration ingestion may be triggered by a conversation system before or during runtime.

At block 1002, if dialog orchestration ingestion is triggered, then the process passes to block 1004. Block 1004 illustrates interrogating the hierarchical coding system to extract values and surface forms to create a conversation workspace of dialog entities. Next, block 1006 illustrates interrogating the hierarchical coding system to define fast access metadata for flattening the hierarchy into an orchestration layer of flattened metadata for each node, and the process ends.

Figure 11:
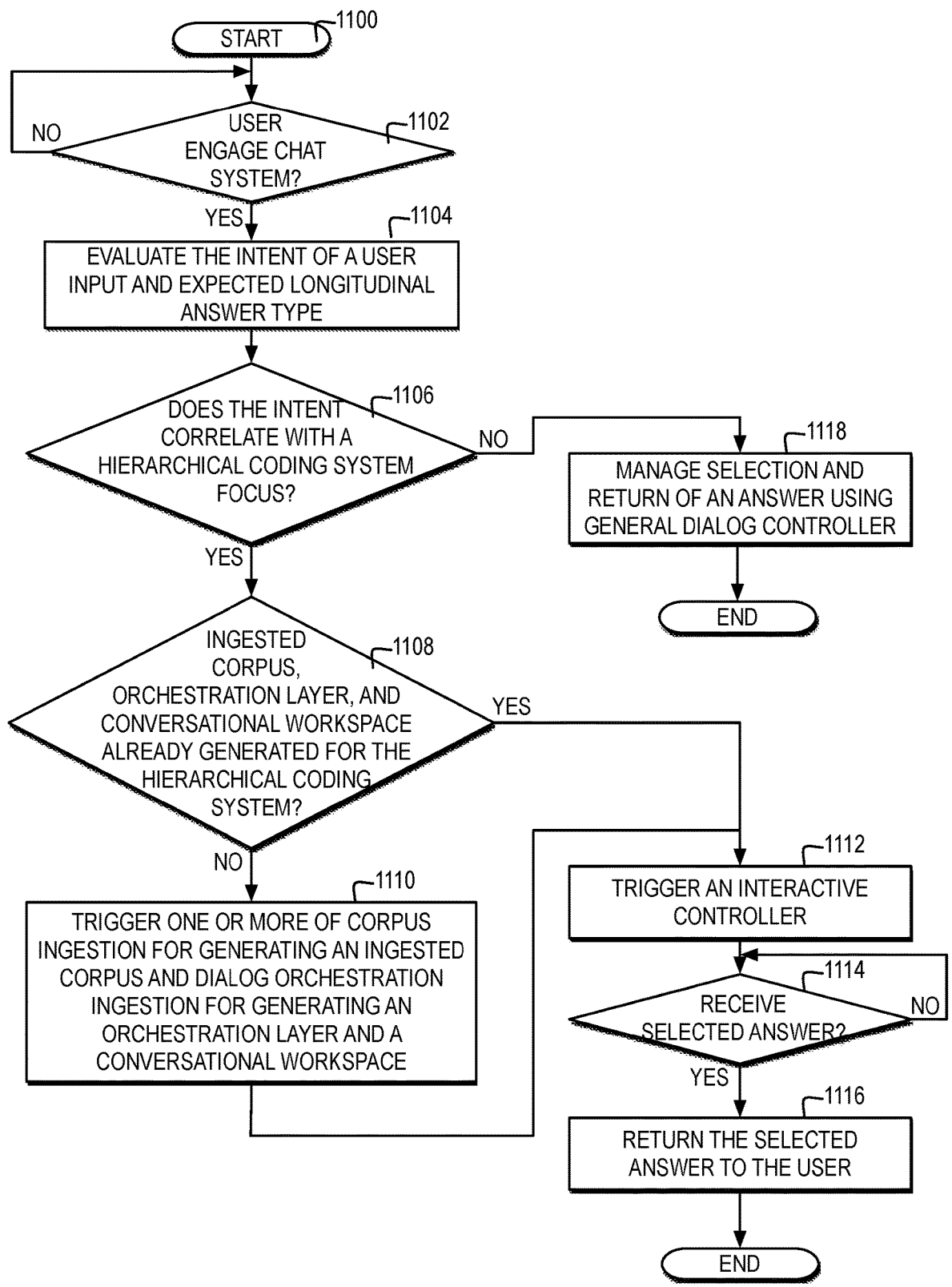
FIG. 11 illustrates one example of a high level logic flowchart of a process and program for supporting a hierarchical specificity controller to manage application of a hierarchical coding system to result in an optimal minimum answer set to a user's initial intent in a conversation dialog.

FIG. 11 illustrates one example of a high level logic flowchart of a process and program for supporting a hierarchical specificity controller to manage application of a hierarchical coding system to result in an optimal minimum answer set to a user's initial intent in a conversation dialog.

In one example, the process and computer program starts at block 1100 and thereafter proceeds to block 1102. Block 1102 illustrates a determination whether a user engages a chat system. At block 1102, if a user engages a chat system, then the process passes to block 1104. Block 1104 illustrates evaluating the intent of a user input and expected longitudinal type. Next, block 1106 illustrates a determination whether the intent correlates with a hierarchical coding system focus.

At block 1106, if the intent correlates with a hierarchical coding system focus, then the process passes to block 1118. Block 1108 illustrates managing a selection and return of an answer using the general dialog controller processes, and the process ends. Returning to block 1106, at block 1106, if the intent correlates with a hierarchical coding system focus, then the process passes to block 1108. Block 1108 illustrates a determination whether an ingested corpus, orchestration layer, and conversational workspace are already generated for the hierarchical coding system.

At block 1108, if an ingested corpus, orchestration layer, and conversational workspace are not already generated for the hierarchical coding system, then the process passes to block 1110. Block 1110 illustrates triggering one or more of corpus ingestion for generating an ingested corpus and dialog orchestration for generating an orchestration layer and conversational workspace, and the process passes to block 1112.

Returning to block 1108, at block 1108, if an ingested corpus, orchestration layer, and conversational workspace are already generated for the hierarchical coding system, then the process passes to block 1112. Block 1112 illustrates triggering an interactive controller. Next, block 1114 illustrates a determination whether selected answers are received. At block 1114, if selected answers are received, then the process passes to block 1116. Block 1116 illustrates returning the selecting answer to the user, and the process ends.

Figure 12:
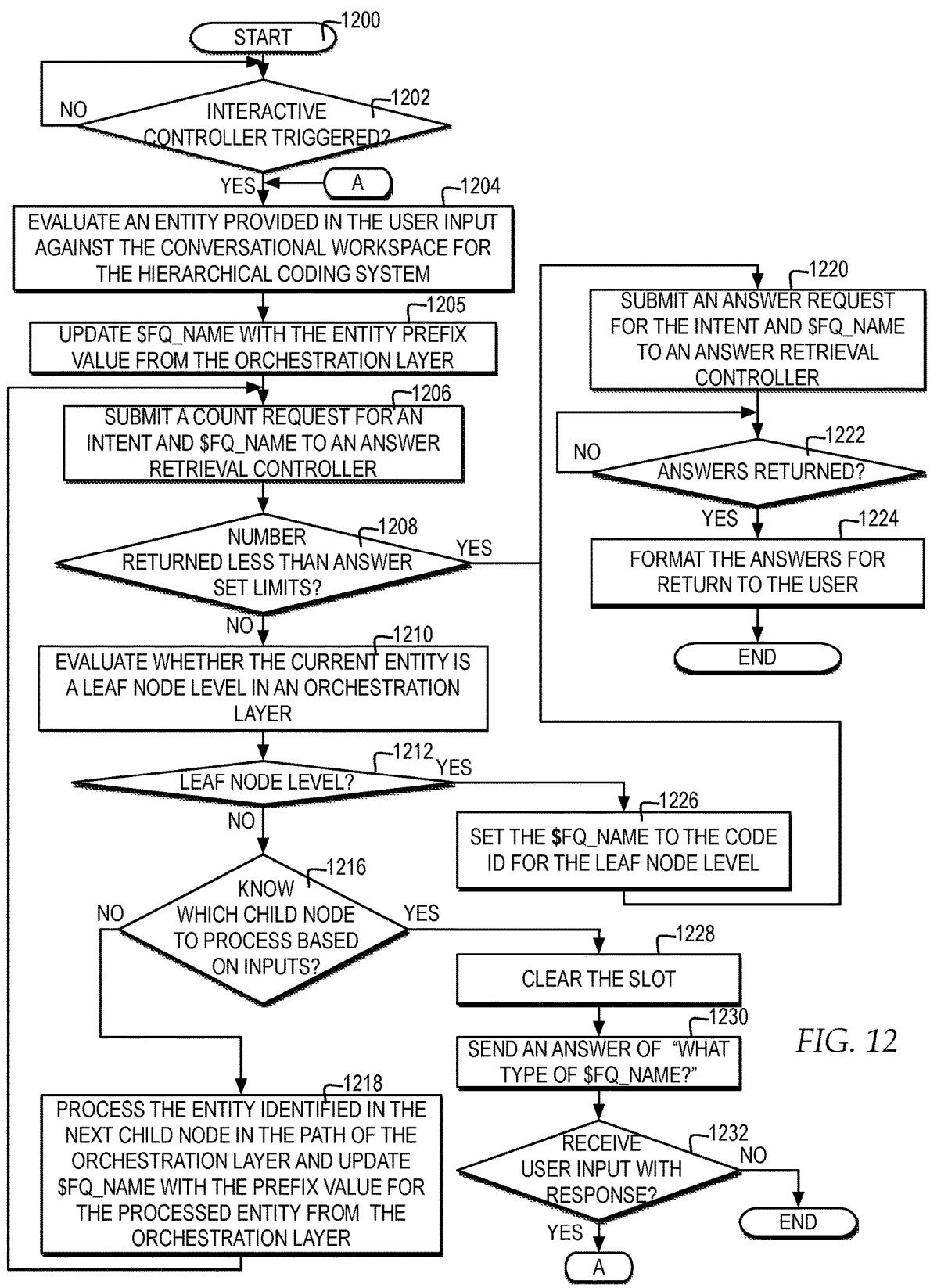
FIG. 12 illustrates one example of a high level logic flowchart of a process and program for supporting an interactive dialog controller to prompt a user submitting an input with an intent correlating with a hierarchical coding system to refine inputs applied to a hierarchical coding system to generate an optimal, minimum answer set to the user's initial intent.

FIG. 12 illustrates one example of a high level logic flowchart of a process and program for supporting an interactive dialog controller to prompt a user submitting an input with an intent correlating with a hierarchical coding system to refine inputs applied to a hierarchical coding system to generate an optimal, minimum answer set to the user's initial intent.

In one example, the process and computer program starts at block 1200 and thereafter proceeds to block 1202. Block 1202 illustrates a determination whether an interactive controller is triggered. At block 1202, if an interactive controller is triggered, then the process passes to block 1204. Block 1204 illustrates evaluating an entity provided in the user input against the conversational workspace for the hierarchical coding system. Next, block 1205 illustrates updating the fully qualified name with the entity prefix value from the orchestration layer. Thereafter, block 1206 illustrates submitting a count request for an intent and fully qualified name to an answer retrieval controller. Thereafter, block 1208 illustrates a determination of whether a number is returned that is less than the answer set limits.

At block 1208, if a number is returned that is less than the answer set limits, then the process passes to block 1220. Block 1220 illustrates submitting an answer request for the intent and fully qualified name to an answer retrieval controller. Next, block 1222 illustrates a determination whether answers are returned. At block 1222, if answers are returned, then the process passes to block 1224. Block 1224 illustrates formatting the answers for return to the user, and the process ends.

Returning to block 1208, at block 1208, if a number is returned that is not less than the answer set limits, then the process passes to block 1210. Block 1210 illustrates evaluating whether the current entity is a leaf node level in an orchestration layer. Next, block 1212 illustrates a determination whether the current entity is a leaf node level.

At block 1212, if the current entity is a leaf node level, then the process passes to block 1226. Block 1226 illustrates setting the fully qualified name to the code ID for the lead node level, and the process passes to block 1220. Returning to block 1212, if the current entity is not a leaf node level, then the process passes to block 1216. Next, block 1216 illustrates a determination whether the child node to process is known based on the inputs.

At block 1216, if the child node to process is known, then a slot condition is fulfilled and the process passes to block 1218. Block 1218 illustrates processing the entity identified in the next child node in the discovered path of the orchestration layer and updating the fully qualified name with the prefix value for the processed entity from the orchestration layer, and the process returns to block 1206. Returning to block 1216, if the child node to process is not known, then the process passes to block 1228. Block 1228 illustrates clearing the slot because the slot condition is not fulfilled and additional followup questions are recommended. Next, block 1230 illustrates sending an answer of "what type of $FQ_NAME?". Thereafter, block 1232 illustrates a determination whether a user input is received in response. At block 1232, if a user input is received in response, then the process returns to block 1204. At block 1232, if no user input is received in response, after a timeout period, then the process ends.

Figure 13:
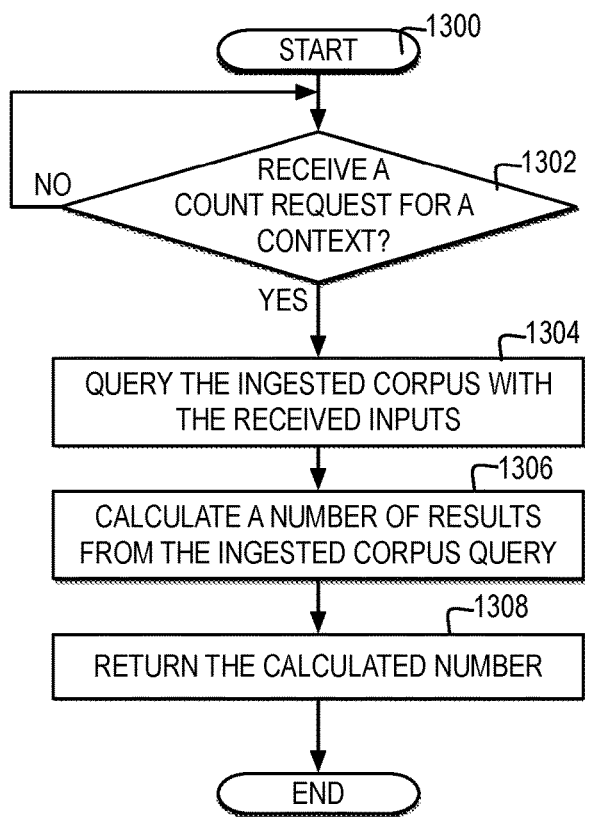
FIG. 13 illustrates one example of a high level logic flowchart of a process and program for supporting an answer retrieval controller to determine a count of answers from an ingested corpus marked with hierarchical codes and correlating to a user's current inputs correlating to a hierarchical coding system.

FIG. 13 illustrates one example of a high level logic flowchart of a process and program for supporting an answer retrieval controller to determine a count of answers from an ingested corpus marked with hierarchical codes and correlating to a user's current inputs correlating to a hierarchical coding system.

In one example, the process and computer program starts at block 1300 and thereafter proceeds to block 1302. Block 1302 illustrates a determination whether a count request for a context is received. In one example, the context may include one or more of an intent, an entity, and a fully qualified name. At block 1302, if a count request for a context is received, then the process passes to block 1304. Block 1304 illustrates querying the ingested corpus with the received inputs. Next, block 1306 illustrates calculating a number of results from the ingested corpus query. Thereafter, block 1308 illustrates returning the calculated number, and the process ends.

Figure 14:
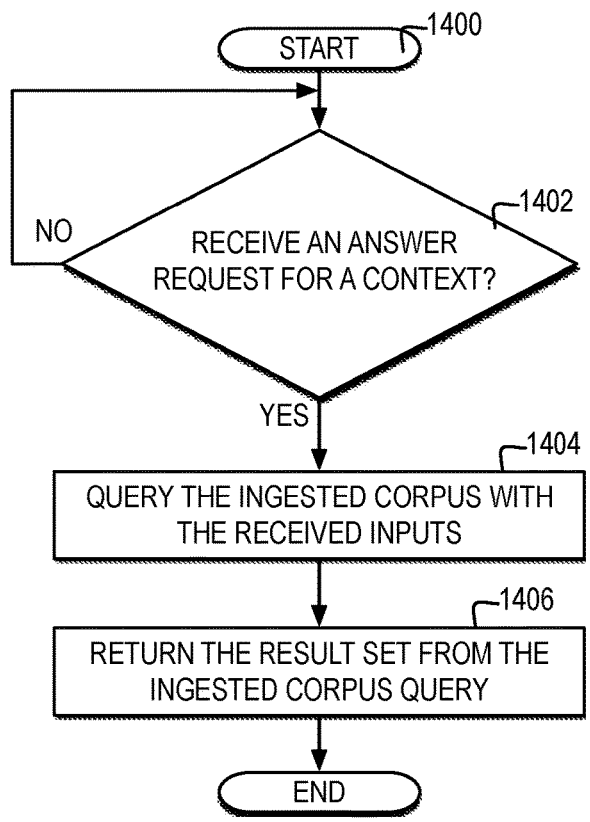
FIG. 14 illustrates one example of a high level logic flowchart of a process and program for supporting an answer retrieval controller to determine an optimal, minimum selection of answers from an ingested corpus marked with hierarchical codes and correlating to a user's current inputs correlating to a hierarchical coding system.

FIG. 14 illustrates one example of a high level logic flowchart of a process and program for supporting an answer retrieval controller to determine an optimal, minimum selection of answers from an ingested corpus marked with hierarchical codes and correlating to a user's current inputs correlating to a hierarchical coding system.

In one example, the process and computer program starts at block 1400 and thereafter proceeds to block 1402. Block 1402 illustrates a determination whether an answer request for a context is received. At block 1402, if an answer request is received, then the process passes to block 1404. Block 1404 illustrates querying the ingested corpus with the received inputs. Next, block 1406 illustrates returning the result set from the ingested corpus query, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    responsive to receiving a user input comprising a query with an intent correlating with a focus of a hierarchical coding system, applying, by a computer, a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels, wherein applying the dialog entity workspace and the orchestration layer includes:
        evaluating the one or more identified entities in the user input based on a correlating node in a respective level of the plurality of levels comprising an entity value matching an identified entity from among a plurality of nodes in the flattened metadata reflecting a plurality of coded values in the hierarchical coding system;
        responsive to the correlating node comprising one or more child nodes in a next level of the plurality of levels, determining, by the computing, that one or more additional levels of specificity beyond the identified level of specificity are recommended to return a minimum answer set to the query; and
        responsive to the correlating node not comprising a leaf node, determining, by the computer, that no additional levels of specificity beyond the identified level of specificity are recommended to return a minimum answer set to the query;
    responsive to determining that the one or more additional levels of specificity beyond the identified level of specificity are recommended to return the minimum answer set to the query, returning, by the computer, one or more answers requesting one or more additional inputs refining the query based on one or more values identified in a next level in the orchestration layer; and
    responsive to determining that no additional levels of specificity beyond the identified level of specificity are recommended to return the minimum answer set to the query, returning by the computer, an answer set comprising a selection of information for a current level of specificity from an ingested corpus of knowledge mapped to the hierarchical coding system.

2. The method according to claim 1, further comprising:
    generating, by the computer, the ingested corpus of information mapped to the hierarchical coding system supporting a hierarchical ontology for a particular domain of information, the hierarchical coding system comprising a plurality of hierarchical concepts mapped to a plurality of code identifiers.

3. The method according to claim 2, wherein generating, by the computer, the ingested corpus of information mapped to the hierarchical coding system supporting a hierarchical ontology for a particular domain of information further comprises:
    ingesting, by the computer, a plurality of documents by parsing one or more sections from each document of value to the particular domain of information;
    normalizing, by the computer, one or more structures of the parsed sections;
    applying, by the computer, one or more natural language processing functions to perform concept and concept value detection of one or more structures;
    mapping, by the computer, the concept and concept values to the plurality of code identifiers each identifying a separate hierarchical concept of a separate node in the hierarchical coding system; and
    generating, by the computer, the ingested corpus comprising the mapped concept and concept values to code identifiers in a searchable database.

4. The method according to claim 1, further comprising:
    generating, by the computer, the dialog entity workspace of the plurality of entities correlating with values in the hierarchical coding system by interrogating the hierarchical coding system to extract a plurality of values and surface forms to create a table with each respective entry identifying an entity, one or more values, and one or more synonyms.

5. The method according to claim 1, further comprising:
    responsive to determining that the one or more additional levels of specificity beyond the identified level of specificity are recommended, responding, by the computer, to the user input with a separate answer requesting an additional input from the user to further refine the query with selectable options from among the one or more child nodes.

6. The method according to claim 1, further comprising:
    responsive to determining that the one or more additional levels of specificity beyond the identified level of specificity are recommended, searching, by the computer, the ingested corpus with a code identifier identified in the correlating node for a selection of answers mapped to the code identifier from among a plurality of documents in the ingested corpus mapped to the hierarchical coding system; and responsive to identifying the selection of answers, responding, by the computer, to the user input with the selection of answers as the minimum answer set.

7. The method according to claim 1, further comprising:
searching, by the computer, the ingested corpus with a fully qualified name reflecting one or more values associated with the one or more identified entities;
determining, by the computer, a selection of answers responsive to the search;
calculating, by the computer, a number of the selection of answers;
responsive to the number of the selection of answers exceeding an answer set limit, determining, by the computer, that additional levels of specificity beyond the identified level of specificity are recommended to return the minimum answer set to the query; and
responsive to the number of the selection of answers not exceeding the answer set limit, returning, by the computer, the selection of answers as the answer set.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to, responsive to receiving a user input comprising a query with an intent correlating with a focus of a hierarchical coding system, apply a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels, wherein the program instructions to apply the dialog entity workspace and the orchestration layer further comprise:
program instructions to evaluate the one or more identified entities in the user input based on a correlating node in a respective level of the plurality of levels comprising an entity value matching an identified entity from among a plurality of nodes in the flattened metadata reflecting a plurality of coded values in the hierarchical coding system;
program instructions to, responsive to the correlating node comprising one or more child nodes in a next level of the plurality of levels, determine that one or more additional levels of specificity beyond the identified level of specificity are recommended to return a minimum answer set to the query; and
program instructions to, responsive to the correlating node not comprising a leaf node, determine that no additional levels of specificity beyond the identified level of specificity are recommended to return a minimum answer set to the query;
program instructions to, responsive to determining that the one or more additional levels of specificity beyond the identified level of specificity are recommended to return the minimum answer set to the query, return one or more answers requesting one or more additional inputs refining the query based on one or more values identified in a next level in the orchestration layer; and
program instructions to, responsive to determining that no additional levels of specificity beyond the identified level of specificity are recommended to return the minimum answer set to the query, return an answer set comprising a selection of information for a current level of specificity from an ingested corpus of knowledge mapped to the hierarchical coding system.

9. The computer system according to claim 8, further comprising:
program instructions to generate the ingested corpus of information mapped to the hierarchical coding system supporting a hierarchical ontology for a particular domain of information, the hierarchical coding system comprising a plurality of hierarchical concepts mapped to a plurality of code identifiers.

10. The computer system according to claim 9, wherein the program instructions to generate the ingested corpus of information mapped to the hierarchical coding system supporting a hierarchical ontology for a particular domain of information further comprise:
program instructions to ingest a plurality of documents by parsing one or more sections from each document of value to the particular domain of information;
program instructions to normalize one or more structures of the parsed sections;
program instructions to apply one or more natural language processing functions to perform concept and concept value detection of one or more structures;
program instructions to map the concept and concept values to the plurality of code identifiers each identifying a separate hierarchical concept of a separate node in the hierarchical coding system; and
program instructions to generate the ingested corpus comprising the mapped concept and concept values to code identifiers in a searchable database.

11. The computer system according to claim 8, further comprising:
program instructions to generate the dialog entity workspace of the plurality of entities correlating with values in the hierarchical coding system by interrogating the hierarchical coding system to extract a plurality of values and surface forms to create a table with each respective entry identifying an entity, one or more values, and one or more synonyms.

12. The computer system according to claim 10, further comprising:
program instructions to, responsive to determining that the one or more additional levels of specificity beyond the identified level of specificity are recommended, respond to the user input with a separate answer requesting an additional input from the user to further refine the query with selectable options from among the one or more child nodes.

13. The computer system according to claim 10, further comprising:
program instructions to, responsive to determining that the one or more additional levels of specificity beyond the identified level of specificity are recommended, search the ingested corpus with a code identifier identified in the correlating node for a selection of answers mapped to the code identifier from among a plurality of documents in the ingested corpus mapped to the hierarchical coding system; and
program instructions to, responsive to identifying the selection of answers, respond to the user input with the selection of answers as the minimum answer set.

14. The computer system according to claim 8, further comprising:
- program instructions to search the ingested corpus with a fully qualified name reflecting one or more values associated with the one or more identified entities;
- program instructions to determine a selection of answers responsive to the search;
- program instructions to calculate a number of the selection of answers;
- program instructions to, responsive to the number of the selection of answers exceeding an answer set limit, determine that additional levels of specificity beyond the identified level of specificity are recommended to return the minimum answer set to the query; and
- program instructions to, responsive to the number of the selection of answers not exceeding the answer set limit, return the selection of answers as the answer set.

15. A computer program product comprises one or more computer readable storage media having program instructions collectively stored thereon, the program instructions executable by a computer to cause the computer to:
- responsive to receiving a user input comprising a query with an intent correlating with a focus of a hierarchical coding system, apply, by a computer, a dialog entity workspace of a plurality of entities correlating with values in the hierarchical coding system and an orchestration layer of flattened metadata reflecting a plurality of levels of a hierarchy in the hierarchical coding system to the user input to identify a level of specificity of one or more identified entities in the user input within the plurality of levels, wherein the program instructions to apply the dialog entity workspace and the orchestration layer further comprise:
  - program instructions to evaluate the one or more identified entities in the user input based on a correlating node in a respective level of the plurality of levels comprising an entity value matching an identified entity from among a plurality of nodes in the flattened metadata reflecting a plurality of coded values in the hierarchical coding system;
  - program instructions to, responsive to the correlating node comprising one or more child nodes in a next level of the plurality of levels, determine that one or more additional levels of specificity beyond the identified level of specificity are recommended to return a minimum answer set to the query; and
  - program instructions to, responsive to the correlating node not comprising a leaf node, determine that no additional levels of specificity beyond the identified level of specificity are recommended to return a minimum answer set to the query;
- program instructions to, responsive to determining that the one or more additional levels of specificity beyond the identified level of specificity are recommended to return the minimum answer set to the query, return one or more answers requesting one or more additional inputs refining the query based on one or more values identified in a next level in the orchestration layer; and
- program instructions to, responsive to determining that no additional levels of specificity beyond the identified level of specificity are recommended to return the minimum answer set to the query, return an answer set comprising a selection of information for a current level of specificity from an ingested corpus of knowledge mapped to the hierarchical coding system.

16. The computer program product according to claim 15, further comprising the program instructions executable by a computer to cause the computer to:
- generate, by the computer, the ingested corpus of information mapped to the hierarchical coding system supporting a hierarchical ontology for a particular domain of information, the hierarchical coding system comprising a plurality of hierarchical concepts mapped to a plurality of code identifiers.

17. The computer program product according to claim 16, further comprising the program instructions executable by a computer to cause the computer to:
- ingest, by the computer, a plurality of documents by parsing one or more sections from each document of value to the particular domain of information;
- normalize, by the computer, one or more structures of the parsed sections;
- apply, by the computer, one or more natural language processing functions to perform concept and concept value detection of one or more structures;
- map, by the computer, the concept and concept values to the plurality of code identifiers each identifying a separate hierarchical concept of a separate node in the hierarchical coding system; and
- generate, by the computer, the ingested corpus comprising the mapped concept and concept values to code identifiers in a searchable database.

18. The computer program product according to claim 15, further comprising the program instructions executable by a computer to cause the computer to:
- generate, by the computer, the dialog entity workspace of the plurality of entities correlating with values in the hierarchical coding system by interrogating the hierarchical coding system to extract a plurality of values and surface forms to create a table with each respective entry identifying an entity, one or more values, and one or more synonyms.

* * * * *